(12) United States Patent
Goodsitt et al.

(10) Patent No.: US 11,231,976 B2
(45) Date of Patent: Jan. 25, 2022

(54) SYSTEM AND METHOD FOR TRIGGERING AN EVENT IN RESPONSE TO A POINT-OF-SALE TRANSACTION

(71) Applicant: Capital One Services, LLC, McLean, VA (US)

(72) Inventors: Jeremy Goodsitt, Champaign, IL (US); Vincent Pham, Champaign, IL (US); Reza Farivar, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/722,738

(22) Filed: Dec. 20, 2019

(65) Prior Publication Data

US 2021/0191791 A1 Jun. 24, 2021

(51) Int. Cl.
| | |
|---|---|
| *G06F 9/54* | (2006.01) |
| *G06Q 20/20* | (2012.01) |
| *G07F 7/10* | (2006.01) |
| *H04W 4/80* | (2018.01) |
| *G06Q 20/32* | (2012.01) |

(52) U.S. Cl.
CPC ............ *G06F 9/542* (2013.01); *G06Q 20/20* (2013.01); *G06Q 20/32* (2013.01); *G07F 7/1008* (2013.01); *H04W 4/80* (2018.02)

(58) Field of Classification Search
CPC ........ G06F 9/542; G06Q 20/20; G06Q 20/32; G07F 7/1008; H04W 4/80
See application file for complete search history.

(56) References Cited

U.S. PATENT DOCUMENTS

| | | | |
|---|---|---|---|
| 8,392,280 B1 | 5/2013 | Kilshaw | |
| 9,902,343 B2 | 2/2018 | Hague | |
| 2002/0035521 A1 | 3/2002 | Powers | |
| 2003/0009360 A1 | 1/2003 | Chaudhary et al. | |
| 2004/0133317 A1 | 6/2004 | Hayakawa et al. | |
| 2009/0177502 A1 | 6/2009 | Doinoff et al. | |
| 2011/0153453 A1 | 6/2011 | Ghafoor et al. | |
| 2012/0232965 A1 | 9/2012 | Rodriguez et al. | |
| 2012/0290201 A1 | 11/2012 | McReaken et al. | |
| 2012/0330696 A1 | 12/2012 | Clark et al. | |
| 2013/0046603 A1* | 2/2013 | Grigg ................ | G06Q 30/0261 705/14.25 |
| 2013/0332578 A1 | 12/2013 | Carroll | |

(Continued)

*Primary Examiner* — Charles E Anya
(74) *Attorney, Agent, or Firm* — Hunton Andrews Kurth LLP

(57) ABSTRACT

A method of triggering an event based on occurrence of a POS transaction is provided in which an event processing server receives from a first user device associated with a first account, a first event triggering request. The request includes identification of a desired event to be triggered and first triggering criteria. The desired event is to be initiated by the event processing server upon occurrence of one or more POS transactions collectively meeting the first triggering criteria. The event processing server receives, from a transaction processing server, notification of an occurrence of a merchant POS transaction associated with the first account. The event processing server determines whether the occurrence of the merchant POS transaction results in the first triggering criteria having been met, and, if so initiates the desired event.

19 Claims, 5 Drawing Sheets

(56) References Cited

U.S. PATENT DOCUMENTS

| | | |
|---|---|---|
| 2014/0066110 A1 | 3/2014 | Lovegreen |
| 2014/0232518 A1 | 8/2014 | Stoehr |
| 2015/0039362 A1 | 2/2015 | Haque |
| 2015/0066606 A1 | 3/2015 | Smirin |
| 2015/0149320 A1 | 5/2015 | Smirin |
| 2016/0092976 A1 | 3/2016 | Marusyk et al. |
| 2016/0128016 A1 | 5/2016 | Avary et al. |
| 2016/0163195 A1 | 6/2016 | O'Hara |
| 2016/0180428 A1 | 6/2016 | Cain et al. |
| 2016/0364657 A1* | 12/2016 | Bryant .................. G06Q 50/30 |
| 2017/0132575 A1 | 5/2017 | Buren |
| 2017/0193626 A1 | 7/2017 | Marco et al. |
| 2017/0352093 A1 | 12/2017 | Armelin et al. |
| 2018/0018731 A1 | 1/2018 | Rodriguez |
| 2018/0060807 A1 | 3/2018 | Avary et al. |
| 2019/0087754 A1* | 3/2019 | Farrelly ................ H04L 67/306 |
| 2020/0082455 A1* | 3/2020 | Kohli ................. G06Q 30/0253 |

* cited by examiner

SYSTEM AND METHOD FOR TRIGGERING AN EVENT IN RESPONSE TO A POINT-OF-SALE TRANSACTION

FIELD OF THE INVENTION

This disclosure relates to mobile device and account card interactions with merchant point-of-sale (POS) devices, and, more particularly to the use of such interactions to automatically trigger actions requested by the holder of an account associated with the interacting mobile device or account card.

BACKGROUND OF THE INVENTION

There are many instances where consumers would find it useful to have a particular action occur immediately after the occurrence of a purchase transaction or other account-related event. In one example, regular customers of certain businesses may find that there are actions that they will always initiate upon completion of their business or shopping experience. In a particular instance of this, a customer who frequently dines at an urban restaurant may find that she always contacts the same rideshare service immediately upon paying her bill. In another example, a customer may be aware that a particular action needs to be taken upon completion of a purchase, but is concerned that he will forget to initiate that action.

There are also instances where a group of people would like to have a certain action taken upon completion of a series of separate transaction events. For example, a group of friends fanning out to shop at different stores may want to have a rideshare service summoned as soon as they have all completed their shopping.

SUMMARY OF THE INVENTION

An illustrative aspect of the invention provides an automated method of triggering an event based on occurrence of a POS transaction. The method comprises receiving, by an event processing server over a network from a first user device associated with a first account, a first event triggering request. The request includes identification of a desired event to be triggered and first triggering criteria. The desired event is to be initiated by the event processing server upon occurrence of one or more POS transactions collectively meeting the first triggering criteria. The method further comprises receiving, by the event processing server from a transaction processing server, notification of an occurrence of a merchant POS transaction associated with the first account, and determining, by the event processing server, whether the occurrence of the merchant POS transaction results in the first triggering criteria having been met. Responsive to a determination that all triggering criteria have been met, the desired event is initiated.

Another aspect of the invention provides an automated system for processing triggered event requests submitted by an account holder. The system comprises a plurality of point of sale POS devices. Each POS device is associated with a merchant and a merchant location and is configured for carrying out transactions with the account holder and transmitting resulting transaction information over a network. The system further comprises a mobile interface device associated with a transaction account of the account holder and configured to receive action request information from the account holder. Action request information includes identification of a desired action to be triggered and user-selected triggering criteria. The desired event is to be initiated upon occurrence of one or more POS transactions collectively meeting the triggering criteria. The mobile interface device is further configured to, and transmit over a network an event triggering request comprising the action request information. The system still further comprises a transaction processing server in communication with the plurality of POS devices. The transaction processing server being configured to receive transaction information from a transmitting POS device, process the transaction, and transmit some or all of the transaction information to authorized recipients over the network. The system also comprises an event processing server in communication with the mobile interface device and the transaction processing server via the network. The event processing server is configured to receive the event triggering request from the mobile interface device, receive the transaction information from the transaction processing server, and, using the transaction information, determine whether the triggering criteria have been met. The event processing server is further configured to, responsive to a determination that the triggering criteria have been met, initiate the desired action.

Another aspect of the invention provides a mobile interface device comprising a data processor, a wireless communication interface in communication with the data processor and configured for selective communication over a wireless network, a user interface comprising at least a user input device and a display, and a memory accessible by the data processor. The memory has stored therein information linking the mobile interface device to a transaction account and a triggered action request application. The triggered action request application includes instructions for the data processor to receive action request information via the user interface. The action request information includes identification of a triggering event associated with the transaction account, triggering criteria, and a desired action to be taken upon occurrence of the triggering event. The triggered action request application also includes instructions for the data processor to transmit, to an event processing server via the wireless communication interface, an event triggering request comprising the action request information.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods in which an account holder can request that predetermined actions be initiated automatically upon the occurrence of an event or events. meeting triggering criteria set by the account holder. These methods involve the use of an event monitor that watches for events on the account holder's account and compares them to the triggering criteria. Upon determining that the triggering criteria have been met, the event monitor initiates the predetermined actions.

Figure 1:
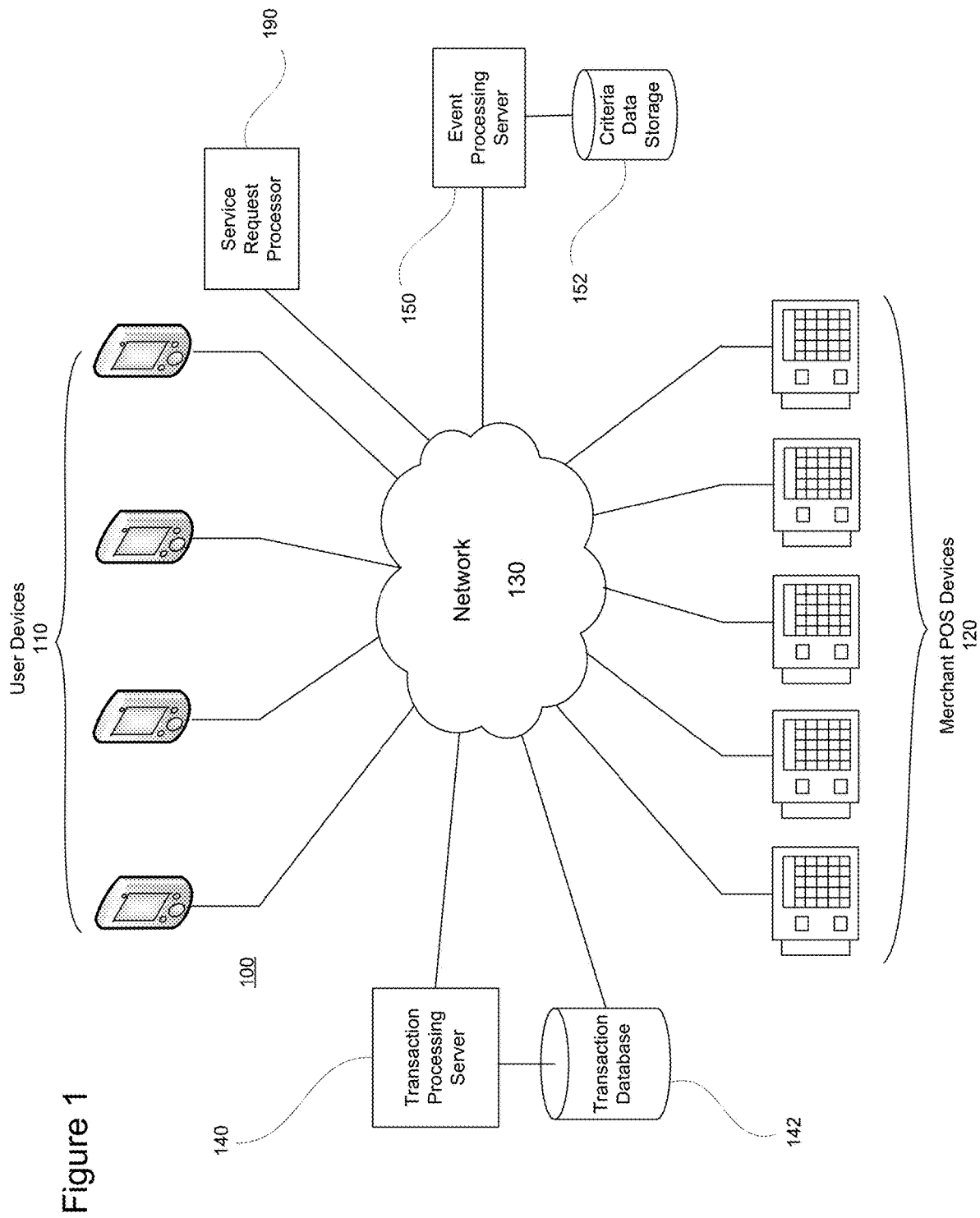
FIG. 1 is a schematic representation of a triggered event processing system according to an embodiment of the invention.

The methods of the invention can be implemented on or in conjunction with any transaction processing or monitoring system. FIG. 1 depicts a triggered event processing system 100 according to an embodiment of the invention. The system 100 may include various network-enabled computer systems, including, as depicted in FIG. 1 for example, a transaction processing server 140, an event processing server 150 with an associated data storage unit 152, and a service request processing server 190. The system 100 also includes a plurality of mobile user devices 110 and a plurality of merchant POS transaction processing devices 120. All of these systems may be or comprise network-enabled processors and any or all may be capable of communication with one another via network 130. In some embodiments, some components of the system 100 may communicate with one another via a second network in addition to or instead of the network 130.

As referred to herein, a network-enabled processor, computer system or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated by the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

In the example embodiments presented herein, an account holder may be any individual or entity that desires to conduct a transaction (which may be, but is not limited to a financial transaction) with a merchant using a transaction account. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. The account holder may be a transaction processing entity such as a financial institution, credit card provider, or other entity that offers accounts to customers. An account may or may not have an associated card, such as, for example, a credit card for a credit account or a debit card for a debit account. The account card may be associated or affiliated with one or more social networking sites, such as a co-branded credit card.

A transaction account may be associated with a transaction card (e.g., a debit card, credit card, or prepaid account card. Alternatively or in addition, the transaction account may be associated with an account holder processing device or simply associated with a unique identifier enterable by the account holder to facilitate a transaction. The processing device may be configured to act as a method of payment at a POS location using, for example, NFC or any other mobile payment technology.

Figure 2:
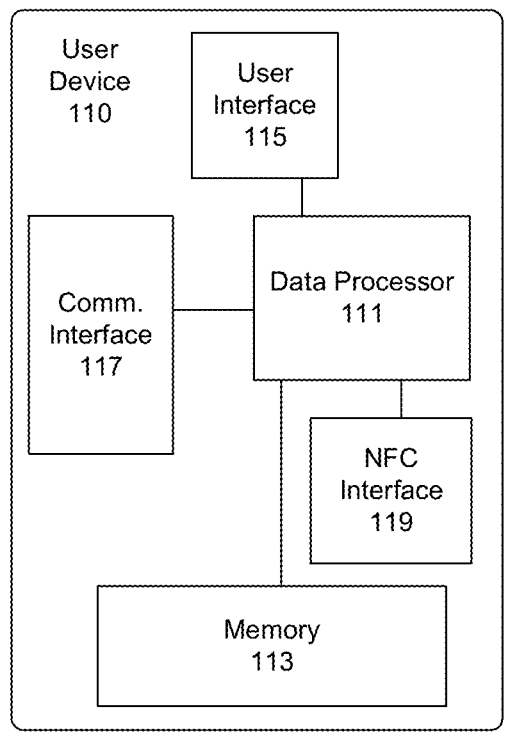
FIG. 2 is a schematic representation of a user processing device according to an embodiment of the invention.

With reference to FIGS. 1 and 2, an account holder user device 110 may be any data processing and/or communication device that an account holder uses to carry out a transaction and/or to receive notifications from the transaction processor 140. In particular embodiments, the user device 110 is a mobile interface device such as a smartphone or tablet. The account holder device 110 includes an on-board data processor 111 in communication with a memory module 113, a user interface 115, and a communication interface 117. In some embodiments, the user device 110 may also include an NFC interface 119. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 115 includes a user input mechanism, which can be any device for entering information and instructions into the account holder device 110, such as a touch-screen, keyboard, mouse, cursor-control device, microphone, stylus, or digital camera. The user interface 115 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 117 is configured to establish and support wired or wireless data communication capability for connecting the device 110 to the network 130 or other communication network. The communication interface 117 can also be configured to support communication with a short-range wireless communication interface via, for example, Bluetooth®.

The NFC interface 119 is in data communication with the data processor 111 and is configured for establishing near field communication with an NFC device. The NFC device may be any device that is or includes an NFC transmitter, receiver or both. In many cases, the NFC device may be or comprise an radio-frequency identification (RFID) transmitter. Such a device may be active or passive and may be in communication with other RFID-capable devices in the system 100. NFC tags, RFID stickers, and NXP MIFARE stickers, as well as interface points for different frequency readers (e.g., readers attuned to non-traditional contactless interface point tunings), non IoT devices, and contactless interface points designed for different technologies (e.g., sonic readers or X-ray readers) may be used within system environment 100.

In particular embodiments of the invention, the NFC device may be another user device 110 having its own NFC interface, a merchant POS device 120, or an account transaction card (e.g., a smart card).

The user device 110 may receive and read NFC transmissions via the NFC interface 119 from the various types of NFC devices in similar manner as discussed herein, or as modified in a manner understood by one of ordinary skill in light of the present disclosure. The user device 110 may utilize the information gathered from the various NFC devices, for example, as "location-based IDs," as triggers to perform a function, or to contact a database for more information.

In various embodiments of the invention, the memory 113 may have stored therein one or more applications usable by the data processor 111 to conduct and/or monitor transactions associated with a particular account. Such transactions may be between an account holder's user device 110 and a merchant device 120 or other device over the network 130. These account applications may include instructions usable by the data processor 111 to identify transaction events, store event data in the memory 113, and communicate event data to the transaction processor 140 and/or the event processing server 150. Some applications may also include instructions relating to receiving and interpreting notifications and/or instructions from the transaction processor 140. Account-related applications may also include instructions relating to user or device authentication and/or transmission of authentication information to an authentication server.

In particular embodiments, the memory 113 may have stored therein an account-related application for requesting that an event processing server 150 cause a particular event to be initiated upon the occurrence of one or more triggering events and/or upon the completion of other event triggering criteria. This application may include instructions for causing the user device 110 to prompt for and receive, via the user interface 115 requested event information and triggering criteria, which may then be transmitted to the event processing server 150. The application may also include instructions to receive notification from the event processing server 150 relating to the occurrence of triggering events, meeting of triggering criteria, or initiation of the triggered event.

In some embodiments, the event triggering application may be configured to provide for event criteria and or triggered events relating to more than one user on a single account or to multiple users each having their own account. In such embodiments, the application may be configured for collaboration between multiple user devices 110, each having the application stored therein. The application may, in particular be configured to prompt the users to establish communication between the user devices 110 via their NFC interfaces (e.g., by causing the devices 110 to contact one another). Such communication can be used to connect the devices 110 for the purposes of requesting a triggered event, for causing account-related events for both devices 110 to be monitored by the event processing server 150, and for receiving notifications from the event processing server 150 relating to triggering and triggered events.

Returning now to FIG. 1, a merchant POS device 120 may be any network enabled processor configured for processing a transaction with an account holder. As used herein, a merchant is any entity with which an account holder carries out a transaction. This may include, without limitation, any retailer, wholesaler, or bartering entity. A merchant may have one or more physical locations or may be an online retailer. The merchant POS device 120 may be any on-site network enabled device (e.g., cash register or other POS terminal) or an on-line transaction server) capable of carrying out the transaction and communicating with the transaction processor 140. In particular embodiments, the POS device includes an NFC interface usable for communication with the user devices 110 and with other account-related transaction devices such as smart cards.

The network 130 may be any form of communication network capable of enabling communication between the transaction entities and the transaction monitoring system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 20 is depicted as a single network, it will be appreciated that it may comprise a plurality of interconnected networks, such as, for example, the Internet, a service provider's network, a cable television network, corporate networks, and home networks.

The transaction processing server 140 is an automated data processing system configured for selective communication with the user devices 110 and the merchant POS devices 120 via the network 130. The transaction processing server 140 may receive account transaction information from any of the user or merchant POS devices. The transaction processing server 140 may be configured to receive a transaction processing request from a requesting device, process the requested financial or other account transaction, and transmit transaction processing results back to the requesting device. The transaction processing server 140 may further be configured to store transaction information in a transaction database 142 and/or to transmit such information or otherwise make such information available to the event processing server 150.

The event processing server 150 is an automated processing system configured for selective communication with the user devices 110. The event processing server 150 is configured, in particular, for receiving a triggered event request from a user device 110 associated with an account. As will be discussed in more detail hereafter, such a request may include information on a specific event to be initiated upon the fulfilment of specified triggering criteria. The event processing server 150 may further be configured to receive authentication information from the requesting user device 110. The event processing server 150 may use this information to authenticate the requesting user device 110 or may transmit the information to an authentication server (not shown) for authentication. The event processing server 150 may further be configured to store event and triggering criteria in a data storage module 152.

The event processing server 150 may also be configured to receive transaction information from one or more of the transaction processing server 140, the user devices 110, and the merchant POS devices. Such transaction information can be used by the event processing server to determine whether any or all of the triggering criteria of the triggered event request have been met.

The event processing server 150 may also be configured to receive transaction event information from one or more of the transaction processing server 140, the user devices 110, and the merchant POS devices. Such information can be used by the event processing server 150 to determine whether any or all of the triggering criteria of the triggered event request have been met. Accordingly, when a new transaction event occurs for the account, the event processing server 150 receives information on the transaction event from the transaction processing server 140 (or, in some applications, an account holder device 110 associated with the account or a merchant device 120). This information may be in the form of a message that includes an account identifier and event information sufficient for determining whether the event relates to the triggering criteria. The transaction event information may include, for example, one or more of the following: transaction value or purchase amount, transaction date and time, location of the transaction, a merchant or vendor identifier, a merchant device identifier, a merchant outlet identifier, type of transaction, and subject matter of the transaction (e.g., goods or services purchased).

The event processing server 150 may further be configured to compare transaction event information to the triggering criteria, and, upon determination that the triggering criteria have been met, take steps to initiate the requested event to be triggered. In some embodiments and some applications, initiating the requested event may include transmitting instructions to a service request processor 190 via the network 130 or another network. The service request processor 190 may be an automated or non-automated system associated with a service or product provider capable of carrying out some or all of the actions necessary to execute the requested event.

Figure 3:
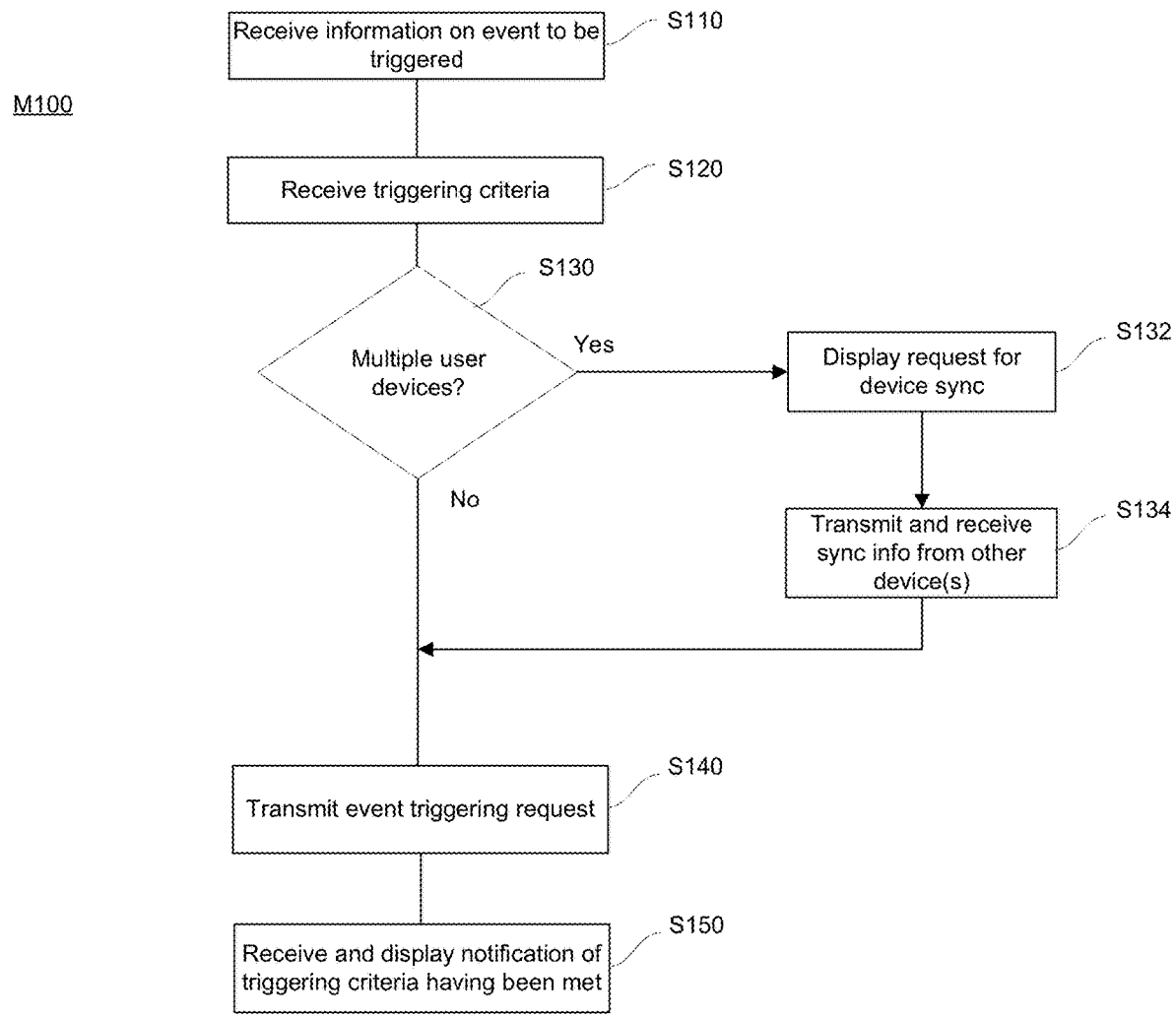
FIG. 3 is a flow chart of actions in a method for requesting a triggered according to an embodiment of the invention.

With reference to FIG. 3, an illustrative method M100 according to an embodiment of the invention provides for the use of a mobile interface device (e.g., a smart phone or tablet) or other user device associated with a user account of an account holder to request that an event be triggered upon satisfaction of user-specified triggering criteria. At S110 of the method M100, the user device receives information on the event the user wishes to have triggered upon satisfaction of triggering criteria. At S120, the user device receives the triggering criteria. Both of these actions S110, S120 may be received from the account holder via the user interface of the user device. Entry of the event information and the triggering criteria will typically be made by the account holder in response to initial prompts upon starting a triggered request application on the user device. In some embodiments, the application may prompt for and receive account information or user authentication information as well.

The event information prompt may include a menu of predefined events or actions that can be selected by the account holder. The events included on the menu could be based, inter alia, on past usage by the account holder or based on popular usage across account holders in a particular geographic area. The types of events that could be requested are limitless, but may typically include such items as service or transportation requests (e.g., for product or food delivery, ride or valet services, etc.), transmission of instructions to smart devices (e.g., appliances, home security systems, home HVAC systems, etc.), and transmission of notifications to individuals or service providers (e.g., automatic transmission of a notification to a baby sitter). Depending on the selection made by the account holder, additional prompts may be used to elicit entry of information required to initiate the requested event. For example, the user could select from the menu of event options "Request a Ride-Share Pick-Up." Additional prompts could be used to obtain specific event-related information such as a pick-up location, a pick-up time or time delay after the event is triggered, and whether the account holder has a preference as to the service provider.

The triggering event criteria may be as simple as the occurrence of a single transaction event associated with the account. For example, in the scenario where the requested event is a ride share pick-up, the account holder may set the triggering event criteria to be the next occurrence of a purchase transaction on the account at a specific restaurant. This is the type of scenario that could be set up for a one-time, triggered event request for an anticipated meal engagement at a known place or time. The triggering criteria for this simple scenario can be expanded in many ways. For example, if the exact restaurant is not known, the criteria could be for the next account transaction at any of a group of restaurants. The criteria could also include a time or day limitation, so that a transaction at the selected restaurant occurring after 7:00 pm on Saturday would trigger the requested event, but a transaction during the lunch hour or on a Tuesday would not.

The triggering criteria prompt may include a menu of potential triggering criteria, which may include, for example, the occurrence of typical account transactions. Depending on the type of transaction selected, the user device may display prompts for additional information that would be used to construct, limit or expand the triggering criteria. As described in the example above, such information may include, but is not limited to, time, day or date restrictions, specification of a particular vendor or group of vendors, purchase type, transaction value, geographical limitations (e.g., within a defined area such as a city or state or within a particular radius of the user device at the time of the request). The information can also include limitations on the particular account-related device used to complete a transaction. For example, the triggering criteria could be limited to a transaction involving the use of the user device. This would eliminate transactions carrying out using a transaction card.

In some embodiments, triggering events may be limited solely to POS transactions having characteristics meeting the specified triggering criteria. In other embodiments, triggering events may be other transaction types or may be non-transaction-related. For example, the user device may be configured to transmit data usable by a tracking system to determine the location of the user device. Accordingly, the triggering event may, in some cases, be the disposition of or passage of the user device through a predefined location or area.

In some embodiments, the user device application may be configured so that the account holder can request that the triggered event be initiated each time the triggering criteria are met, rather than just the next occurrence.

In some embodiments, an account holder may want the triggering criteria to specify the occurrence of more than one triggering event. In such a case, the account holder would need to provide information for each such triggering event. For example, an account holder may know that he is going to dinner at a particular restaurant and to shop at a particular store, but not in which order. The account holder could request a notification (the triggered event) be transmitted to an individual (e.g., a baby sitter) only after occurrence of both a purchase transaction at the restaurant and a purchase transaction at the store.

In some cases, an account holder may wish the triggering criteria to include transactions involving one or more other user devices. Such devices may be associated with the same account or may be associated with other accounts managed by the same account administrator. Accordingly, the method M100 may optionally include at S130 the action of determining whether multiple user devices are to be used. The triggered event application may be configured to prompt the account holder to enter a number of user devices to be associated with an event triggering request. If multiple user devices are to be associated with the request, the user device is instructed to display a device synchronization request at S132. Device synchronization can then be accomplished through NFC communication between all participating user devices and the requesting user device (e.g., by tapping them together). The user device receives synchronization information needed by the event processing server to monitor transactions carried out using the additional user devices, and, if applicable, send notifications to these devices upon the occurrence of transactions meeting the triggering criteria.

At S140, the triggered event application causes the user device to transmit an event triggering request to the event processing server. The event triggering request includes the desired triggered event information and the triggering criteria. The request may also include additional authentication information usable by the event processing server to authenticate the user and/or the user device. The event triggering request may also include information on additional user devices and associated accounts for which transaction events need to be monitored in order to determine whether the triggering criteria are met.

In some embodiments, the method M100 may include the action at S150 to receive and display a notification from the event processing server that all triggering criteria have been met. The significance of such a notification is greatly increased if more than one user and user device is involved. In such a case, all such user devices may receive the notification, which may, for example, advise all users that the triggered event has been initiated or will be initiated at a certain time.

Figure 4:
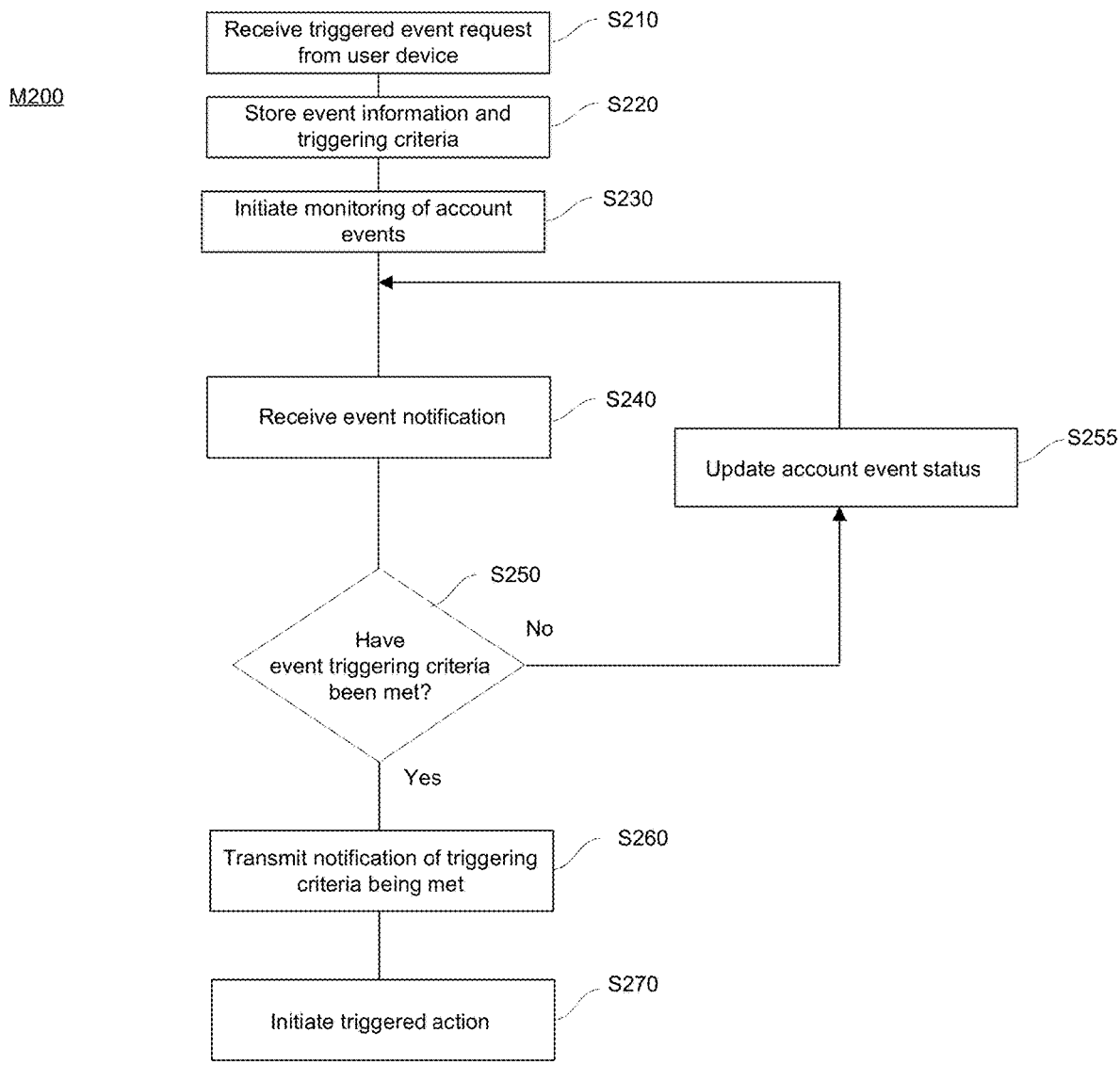
FIG. 4 is a flow chart of actions in a method for processing and implementing a triggered action request according to an embodiment of the invention.

With reference to FIG. 4, an illustrative method M200 according to an embodiment of the invention provides for the use of an event processing server (e.g., the event processing server 150 of system 100 in FIG. 1) to process and implement a triggered event request from a user device. At S210, a triggered event request is received by the event processing server over a network from a user device associated with an account. The triggered event request includes information on the event the account holder wishes to have triggered upon satisfaction of triggering criteria. The request also includes the triggering criteria. In some embodiments, the method M200 may include receiving, as part of the triggered event request, user or device authentication information, which the server may use to verify authorization of the user and/or user device to make the triggered request. In such embodiments, the server will proceed to process the request only upon completion of a positive verification.

The triggered event request may be received as a single transmission comprising all the event information and triggering criteria. Alternatively, the action of receiving the event request may comprise conducting an interactive session in which the event processing server transmits instructions to the user device to prompt for, receive, and transmit back to the event processing server the information necessary to process the request. As part of such a session, the event processing server may transmit a menu of suggested events or actions that can be selected by the account holder as the event to be triggered. Some or all of the suggested events or actions could be determined by the event processing server based on prior transaction information for the account. Alternatively or in addition, the menu may include typical account holder events for all accounts or events that are popular across accounts in a particular geographic area. Requested event types could include, without limitation, service or transportation requests, financial transactions (e.g., funds transfers), product orders, transmission of instructions to smart devices, and transmission of notifications to individuals or service providers. Based on the event type requested, the event processing server may transmit prompts for additional information required to initiate the requested event (e.g., location, time or time delay after the event is triggered, preferred service provider, etc.).

As previously noted, the triggering event criteria may be the occurrence of a single transaction event associated with the account. In such cases, the triggered event request need only include the characteristics of the triggering transaction. The transaction characteristics, however, may be broad or narrow. For example, the triggering criteria could be the use of the account for a purchase at any restaurant in a geographical area or it could be limited to a purchase at a specific restaurant. In addition to geographic or vendor type limitations, the criteria could also include purchase type, a time or day of the week limitation, a value range limitation, a date range limitation, etc. Triggering criteria can also include a limitation on the particular account-related device used to complete the transaction.

In some embodiments, the triggering criteria may be based on information other than transaction information. This could include, for example, events relating to the physical location of the user device. For example, the triggering criteria could include the occurrence of the user device entering a defined geographic area. Triggering criteria may also specify that the occurrence of multiple triggering events. For example, the triggering criteria may specify a purchase of movie tickets and a restaurant purchase occurring on the same day. In some cases, such events may be required to occur in a particular sequence.

In some embodiments, the triggered event request may specify that the triggered event be initiated every time the triggering criteria are met, rather than just the next occurrence.

It will be understood that the triggering criteria may require the occurrence of more than one triggering event. In such a case, the event processing server must receive from the user device information for each such triggering event.

In some embodiments, the triggered event request may provide alternative events that would be triggered depending on additional criteria provided by the requester. For example, the request could specify that the triggered event would be arrangement of open air transportation (e.g., a scooter) if the weather is fair and arrangement of closed vehicle transportation (e.g., automobile ride share) if precipitation is occurring or expected.

Upon receiving all necessary information to process a triggered event request, the event information and triggering criteria may be stored at S220 by the event processing server in a data storage unit for later retrieval and use. At S230, monitoring of events associated with the account is initiated. This may include notification of the transaction processor that information on all transactions associated with the account should be transmitted to the event processing server. At S240, the event notification is received that indicates an event related to the account has occurred. The event notification will typically be received by the event processing server from the transaction processor. In some cases, however, the event notification may be received by the event processing server directly from the user device or from a vendor POS device. The event notification includes information about the transaction or other event that can be used to determine if the triggering criteria have been met. At S250, the event notification information is used by the event processing server to determine if the triggering criteria have been met. For single transaction criteria, the server need only determine whether the characteristics of the transaction fall within the triggering transaction criteria. If not, the server simply continues to monitor account transactions. If so, the server ceases to monitor and initiates the triggered action at S270. Optionally, the server may also transmit a notification to the user device at S260.

In instances where the triggering criteria specify the occurrence of more than one transaction (or other event), the determination of whether the triggering criteria have been met may require a two-step inquiry. First, the server would determine whether the transaction characteristics meet the criteria for one of the events specified in the triggering criteria. If it does, the server would then check to see if the other specified transactions have previously been deemed to have occurred. The occurrence or non-occurrence of specified transactions may be captured in a stored account event status. If, after the occurrence of the latest specified transaction, the triggering criteria have not been met, the server updates the account event status to reflect the occurrence of the latest event at S255 and continues to monitor account transactions. On the other hand, if, after the occurrence of the latest specified transaction, the triggering criteria have been met, the method proceeds with initiation of the triggered action at S270.

As noted above, an account holder may wish the triggering criteria to include transactions involving one or more other user devices. Such devices may be associated with the same account or may be associated with other accounts managed by the same account administrator. Accordingly, the method M200 may, in some embodiments, optionally include the action of determining whether multiple user devices are to be used. If multiple user devices are to be associated with the request, the method M200 may include transmitting an instruction to the user device to synchronize with the user devices. The event processing server then receives synchronization information from the requesting user device. The synchronization information includes account and user device information for the additional user devices. In such embodiments, the actions S230, S240, S250 and, if applicable, S255 associated with monitoring account events and determining when triggering criteria are met would include monitoring events on all accounts associated with the synced user devices. Further, the notification action at S260 would include sending notifications to each of these devices upon meeting the triggering criteria.

Figure 5:
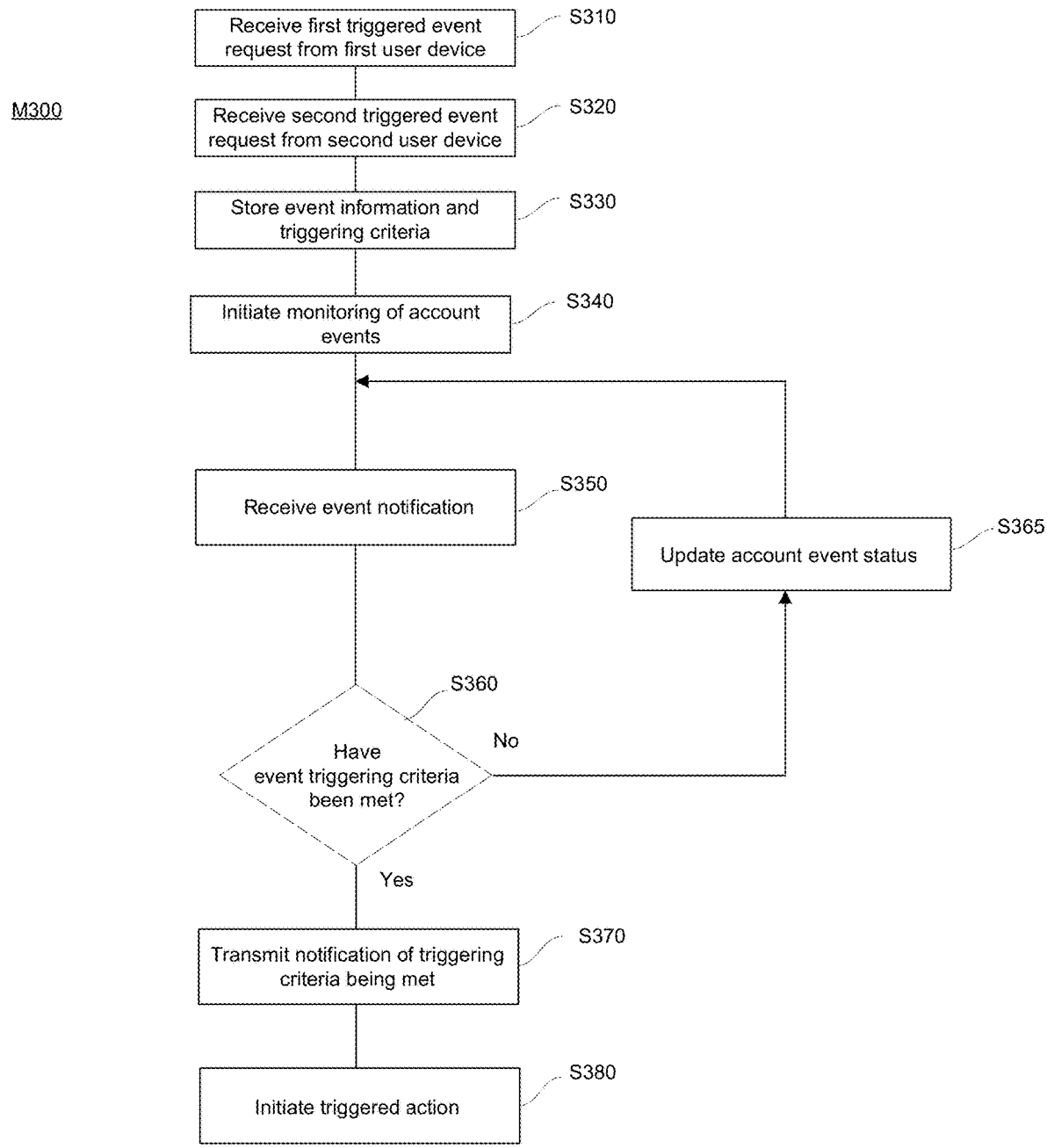
FIG. 5 is a flow chart of actions in a method for processing and implementing a triggered action request according to an embodiment of the invention.

FIG. 5 illustrates an alternative method M300 for processing and implementing related triggered event requests from multiple user devices according to an embodiment of the invention. In this embodiment, an event processing server receives a first triggered event request from a first user device associated with a first account at S310 and a second triggered event request from a second user device associated with a second account at S320. The first triggered event request includes information on the event a first account holder wishes to have triggered upon satisfaction of first triggering criteria. In some embodiments, the method may also include receiving, as part of each triggered event request, user or device authentication information, which the server may use to verify authorization of the user and/or user device to make the triggered request.

The types of event information and triggering criteria for the two requests are similar to those discussed above and may be received in similar fashion. In the method M300, however, when the second request is received, the second user device has already been synchronized with the first user device. Accordingly, the second request makes reference to the first request so that the event processing server is alerted to the fact that the requested event will only be triggered upon satisfaction of the triggering criteria in both requests. The first request may also include an indication that a second user device and/or account will be associated with the requested event and triggering criteria.

The triggering event criteria for each request may be the occurrence of a single transaction event associated with the account associated with the request or multiple transaction events.

Upon receiving all necessary information to process the triggered event requests, the event information and triggering criteria may be stored at S330 in a data storage unit for later retrieval and use. At S340, the event processing server initiates monitoring of events associated with the first account and the second. At S350, the event processing system receives an event notification indicating that an event related to one of the accounts has occurred. At S360, the event notification information is used by the event processing server to determine if all triggering criteria have been met. This determination may require a two-step inquiry. First, the server would determine whether the transaction characteristics meet the criteria for one of the two requests. If it does, the server would then check to see if the criteria for the other request had previously been deemed to have been met. The occurrence or non-occurrence of specified transactions meeting some or all of the criteria of either request may be captured in a stored account event status. If, after the occurrence of the latest specified transaction, the triggering criteria have not been met for both requests, the account event status is updated to reflect the occurrence of the latest event at S365 and the method continues with further monitoring of the account transactions. If the criteria associated with one of the accounts is satisfied, monitoring of that account may be stopped. If, after the occurrence of the latest specified transaction, the triggering criteria for both requests have been met, the method proceeds with transmitting at S370 a notification to both user devices and initiating the triggered action at S380. In some embodiments, the notification sent to one or both of the user devices may request confirmation that the triggered action should be initiated. In such embodiments, the action to initiate at S380 would be carried out only upon receiving positive confirmation in response to the request.

It will be understood that the method M300 can be expanded to any number of user devices and requests.

The present invention provides a significant improvement in the automated functionality of account-associated computing devices and their ability to provide services to and enhance convenience for account holders.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method of triggering an event based on occurrence of a point-of-sale (POS) transaction, the method comprising:
    receiving, by an event processing server over a network from a first user device associated with a first account, a first event triggering request including identification of a desired event to be triggered and first triggering criteria;
    receiving, by the event processing server over the network from a second user device associated with a second account, a second event triggering request including identification of the first event triggering request and second triggering criteria;
    after receiving the first event triggering request from the first user device and the second event triggering request from the second user device, receiving, by the event processing server from a transaction processing server, notification of an occurrence of a merchant POS transaction associated with the first account or the second account;
    determining, by the event processing server, whether the occurrence of the merchant POS transaction results in all triggering criteria having been met; and
    responsive to a determination that all triggering criteria have been met, initiating the desired event,
    wherein the desired event and the first triggering criteria are specified by a first user without input from the event processing server and the first triggering criteria include specific time and date limitations and identification of one or more exact POS transactions that must occur before initiation of the desired event, and
    wherein the second triggering criteria are specified by a second user without input from the event processing server and include identification of a second one or more exact POS transactions involving the second account that must occur before initiation of the desired event.

2. An automated method according to claim 1 wherein the actions of receiving notification and determining are repeated for each new merchant POS transaction associated with the account and the action of initiating the desired event is carried out responsive only to a first occurrence of all triggering criteria having been met.

3. An automated method according to claim 1 wherein the actions of receiving notification and determining are repeated for each new merchant POS transaction associated with the account and the action of initiating the desired event is carried out responsive to each determination that all triggering criteria have been met.

4. An automated method according to claim 1 wherein the first and second triggering criteria each include at least one of the set consisting of:
    an occurrence of a merchant POS transaction at a particular location;
    an occurrence of a merchant POS transaction involving a particular merchant; and
    an occurrence of a merchant POS transaction within the date and time limitations.

5. An automated method according to claim 1 wherein the first triggering criteria consists of an occurrence of a first triggering POS transaction having characteristics identified in the first event triggering request and the second triggering criteria consists of an occurrence of a second triggering POS transaction having characteristics identified in the second event triggering request.

6. An automated method according to claim 5 wherein the action of initiating the desired event is carried out only if the first triggering POS transaction and the second triggering POS transaction occur within a specified time interval of one another.

7. An automated method according to claim 1 wherein the first triggering criteria includes an occurrence of a merchant POS transaction involving a particular merchant at a specified location within specific time and date limitations.

8. An automated method according to claim 1 wherein the first triggering criteria are user-specified transaction characteristics usable to identify a specific anticipated POS transaction.

9. An automated method according to claim 1 wherein
    the desired action is or includes transportation being provided at a specified location, and
    the action of initiating the desired action includes transmitting a transportation request to a transportation provider.

10. An automated method according to claim 1 wherein
    the desired action is or includes effecting an operation of a smart machine, and
    the action of initiating the desired action includes transmitting an instruction to the smart machine to effect the operation.

11. An automated system for processing triggered event requests submitted by an account holders, the system comprising:
    a plurality of point of sale (POS) devices, each POS device being associated with a merchant and a merchant location and being configured for carrying out transactions with the account holders and transmitting resulting transaction information over a network;
    a plurality of mobile interface devices each associated with a transaction account of one of the account holders and configured to
        receive action request information from the one of the account holder, the action request information including identification of a desired action to be triggered and user-provided triggering criteria, the desired event to be initiated upon occurrence of one or more POS transactions collectively meeting the triggering criteria, and
        transmit over a network an event triggering request comprising the action request information;
    a transaction processing server in communication with the plurality of POS devices, the transaction processing server being configured to
        receive transaction information from a transmitting POS device,
        process the transaction, and
        transmit some or all of the transaction information to authorized recipients over the network;

an event processing server in communication with the mobile interface devices and the transaction processing server via the network, the event processing server being configured to
  receive a first event triggering request from a first mobile interface device, the first event triggering request including first triggering criteria, and
  receive a second event triggering request from a second mobile interface device, the second event triggering request including second triggering criteria and identification of the first event triggering request,
  after receiving the first and second event triggering requests, receive the transaction information from the transaction processing server,
  using the transaction information, determine whether the first and second triggering criteria have been met, and
  responsive to a determination that the first and second triggering criteria have been met, initiate the desired action,
wherein the desired event and the triggering criteria are specified without input from any other component of the automated system, and
wherein the first and second triggering criteria include specific time and date limitations and identification of one or more exact POS transactions that must occur before initiation of the desired event.

12. An automated system according to claim 11 further comprising:
  a service request processing server associated with a service provider, the service request processing server being configured for receiving and facilitating requests for service by the service provider,
  wherein the action of the event processing server to initiate the desired action includes transmitting a service request to the service request processing server.

13. An automated system according to claim 11 further comprising:
  at least one smart machine associated with the account holder, the smart machine being in communication with the event processing server via the network,
  wherein the action of the event processing server to initiate the desired action includes transmitting an instruction to the smart machine to effect a specified operation.

14. An automated system according to claim 11 wherein at least one of the first and second triggering criteria includes an occurrence of a POS transaction involving a specified merchant.

15. An automated system according to claim 11 wherein at least one of the first and second triggering criteria includes an occurrence of a POS transaction at a specified merchant location.

16. An automated system according to claim 11 wherein at least one of the first and second triggering criteria includes an occurrence of a merchant POS transaction involving a particular merchant on a specified date within specific time and date limitations.

17. A mobile interface device comprising:
  a data processor;
  a wireless communication interface in communication with the data processor and configured for selective communication over a wireless network;
  a user interface comprising at least a user input device and a display; and
  a memory accessible by the data processor, the memory having stored therein information linking the mobile interface device to a transaction account, and a triggered action request application including instructions for the data processor to
    receive action request information via the user interface, the action request information including identification of a triggering event associated with the transaction account, triggering criteria, and a desired action to be taken upon occurrence of the triggering event; and
    transmit, to an event processing server via the wireless communication interface, an event triggering request comprising the action request information,
  wherein the action request information is specified by a user without input from any other device,
  wherein the triggering criteria include specific time and date limitations and identification of one or more exact POS transactions that must occur before initiation of the desired action, and
  wherein the action request information includes identification of a previous event triggering request transmitted by a different mobile interface device and including, previous event triggering criteria.

18. A mobile interface device according to claim 17 wherein the triggering event is a POS transaction carried out using a payment device associated with the transaction account and the triggering criteria includes occurrence of the POS transaction within the specific time and date limitations.

19. A mobile interface device according to claim 17 wherein
  the memory further has stored therein a transaction application for carrying out a purchase transaction with a merchant using the account, and
  the triggering event is a POS transaction carried out using the transaction application.

* * * * *